(12) United States Patent
Rosner et al.

(10) Patent No.: US 6,298,376 B1
(45) Date of Patent: *Oct. 2, 2001

(54) FAULT TOLERANT COMMUNICATION MONITOR FOR A MASTER/SLAVE SYSTEM

(75) Inventors: Lisa E. Rosner, East Windsor; Karanam Rajaiah, Bristol; Karl D. Pedersen, Ansonia; Joseph Krisciunas, Bristol; Mark Culler, Glastonbury; Veronica Kertesz, Bristol, all of CT (US); Jonathan A. Wolf, Cambridge, MA (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,258

(22) Filed: Mar. 7, 1997

(51) Int. Cl.[7] .......................... G06F 15/16; G06F 15/173
(52) U.S. Cl. .......................... 709/209; 709/208; 709/224
(58) Field of Search ........................ 395/184.01; 709/208, 709/209, 224, 203, 207, 223, 227, 244; 370/216, 242

(56) References Cited

U.S. PATENT DOCUMENTS

| | | | |
|---|---|---|---|
| 4,610,013 | * | 9/1986 | Long et al. . |
| 4,610,031 | * | 9/1986 | Long et al. .............................. 714/11 |
| 4,672,501 | | 6/1987 | Bilac et al. .............................. 361/96 |
| 4,718,002 | * | 1/1988 | Carr ...................................... 709/201 |

(List continued on next page.)

FOREIGN PATENT DOCUMENTS

| | | |
|---|---|---|
| 0 439 331 A2 | 1/1991 | (EP) . |
| 0 562 333 A2 | 3/1993 | (EP) . |
| 2 272 611 A | 11/1992 | (GB) . |
| PCT/US89/00991 | 3/1989 | (WO) . |

OTHER PUBLICATIONS

Dal Cin et al., "Error Detection Mechanisms for Massively Parallel Multiprocessors", ISBN: 0–8186–3610–6, IEEE Proceedings, pp. 401–408, Jan. 1993.*

Menon et al., "Object Replacement Using Dynamic Proxy Updates", ISBN: 0–8186–5390–6, IEEE Proceedings, pp. 82–91, Mar. 1994.*

Nelson et al., "A Highly Available Scalable ITV System", ISBN: 0–89791–715–4, ACM Symposium, pp. 54–67, Dec. 1995.*

Grant et al., "Computerized Perfomance Monitors as Multidimensional systems: derivation and application", ACM Transactions on Information Systems, vol. 14, No. 2, pp. 212–235, Apr. 1996.*

*Primary Examiner*—Zarni Maung
*Assistant Examiner*—Jason D. Cardone
(74) *Attorney, Agent, or Firm*—Cantor Colburn LLP; Carl B. Horton

(57) ABSTRACT

A communication bus containing master and slave devices includes a monitor unit for fault tolerant communications. In the event the master is unable to communicate, the monitor automatically assumes the master communication role. When more than one monitor is connected within the communications network, the monitor with the lowest communications address assumes the master communications role. The master includes software implementation that allows an operator to obtain data from any of the slave devices via the monitor.

12 Claims, 5 Drawing Sheets

U.S. PATENT DOCUMENTS

| | | | | |
|---|---|---|---|---|
| 4,814,984 | * | 3/1989 | Thompson . | |
| 4,817,037 | | 3/1989 | Hoffman et al. | 364/200 |
| 4,884,287 | * | 11/1989 | Jones et al. | 375/377 |
| 4,907,146 | * | 3/1990 | Caporali | 224/94 |
| 5,005,122 | * | 4/1991 | Griffin et al. | 709/203 |
| 5,021,938 | * | 6/1991 | Hayakawa | 364/132 |
| 5,039,980 | * | 8/1991 | Aggers et al. | 340/506 |
| 5,058,057 | * | 10/1991 | Morita et al. | 710/114 |
| 5,086,384 | * | 2/1992 | Fukada | 364/187 |
| 5,390,351 | * | 2/1995 | Di Giuliu et al. | 709/225 |
| 5,418,937 | * | 5/1995 | Inoue | 714/47 |
| 5,418,955 | * | 5/1995 | Ikeda et el. | 713/1 |
| 5,461,608 | * | 10/1995 | Yoshiyama | 370/222 |
| 5,553,239 | * | 9/1996 | Heath et al. | 395/187.01 |
| 5,560,022 | * | 9/1996 | Dunstan et al. | 713/300 |
| 5,684,803 | * | 11/1997 | Thuy | 370/451 |
| 5,704,032 | * | 12/1997 | Badovinatz et al. | 370/245 |
| 5,752,047 | * | 5/1998 | Darty et al. | 713/300 |
| 5,809,222 | * | 9/1998 | Kizu et al. | 714/4 |
| 5,862,391 | * | 1/1999 | Salas et al. | 395/750.01 |
| 5,951,683 | * | 9/1999 | Yuuki et al. | 713/1 |
| 5,999,983 | * | 12/1999 | Ichimi et al. | 709/239 |

* cited by examiner

FAULT TOLERANT COMMUNICATION MONITOR FOR A MASTER/SLAVE SYSTEM

BACKGROUND OF THE INVENTION

The interconnection of a number of electrical equipment for supervisory control and data acquisition is described within U.S. patent application Ser. No. 08/628,533 filed Apr. 3, 1996 entitled "Dynamic Data Exchange Server Simulator". The electrical equipment is interconnected within a LAN utilizing a Modbus protocol which is a trademark of New Modicon Inc. for RS-485 data format.

The Modbus protocol calls for a master-slave regime for communicating with the PC or CPU, as master, on the communicationis bus and the associated electrical equipment or devices, as slaves. The master is able to communicate with any of the associated devices which are then only able to respond and communicate with the master. A good definition of the master-slave regime is found in U.S. Pat. No. 4,817,037 entitled "Data Processing System With Overlap Bus Cycle Operations".

With such master-slave regimes, in the event the master is unable to period the corresponding slave electrical devices would operate independently without instructions from the master. Alternatively, the communications bus could be disabled while removal and repair of the master is undertaken.

U.S. patent application Ser. No. 08/804,052 filed on Feb. 21, 1997 entitled "Interface Monitor for Communicating Between Different Communications Protocols" describes a supplemental monitor unit that connects with the communication bus as well as with a PC, acting temporarily as a master, to allow the PC to interrogate the associated electrical devices without hardware connection between the PC and the communication bus.

It has been determined that the same monitor unit can also be used to act as a temporary master, i.e. provide "fault tolerance" in the event that the system's master becomes unable to communicate.

One purpose of the instant invention, is to provide a monitor unit that allows communication with electrical elements or slaves interconnected with a communication bus when the PC or master is no longer capable of transmission.

In some industrial applications, the master is remote from the associated electrical devices and the monitor is more readily accessible by an on-site operator. The monitor is then interrogated to obtain data from any of the electrical devices and the master addresses the electrical devices allow the monitor to obtain the data from the LAN. In accordance with the master-slave protocol the monitor, as a slave, is unable to directly interrogate the master to obtain the data.

Earlier attempts to improve this problem incur the use of additional multiplexing equipment for switching between the master and the monitor for communicating on the LAN such as proposed by the Square D Power Logic Network type 8030 CRM 565. A later approach to this problem is the incorporation of a pass-through module such as the Cutler Hammer type AEM11.

It would be advantageous as to time and expense to allow a monitor to obtain device data from any of the devices in real time.

A further purpose of the invention, is to provide an operating program within the master that allows the monitor to obtain data from any of the devices without incurring additional equipment and without having to incur a measurable time delay.

SUMMARY OF THE INVENTION

A monitor unit is connected with a LAN that is formatted with master-slave regime protocol and which is interconnected with a plurality of electrical devices. A stand-alone PC, acting as master, is able to communicate with any of the electrical devices as slaves which are unable to communicate with each other. The monitor includes a processor that is programmed to allow communication between the monitor unit and any of the electrical devices in the event the master becomes disabled. When more than one monitor is connected within the communication bus, a separate program decides which of the devices can act as the master. The monitor further allows an operator to directly obtain data from any of the electrical devices.

DESCRIPTION OF THE PREFERRED EMBODIMENT

Figure 1:
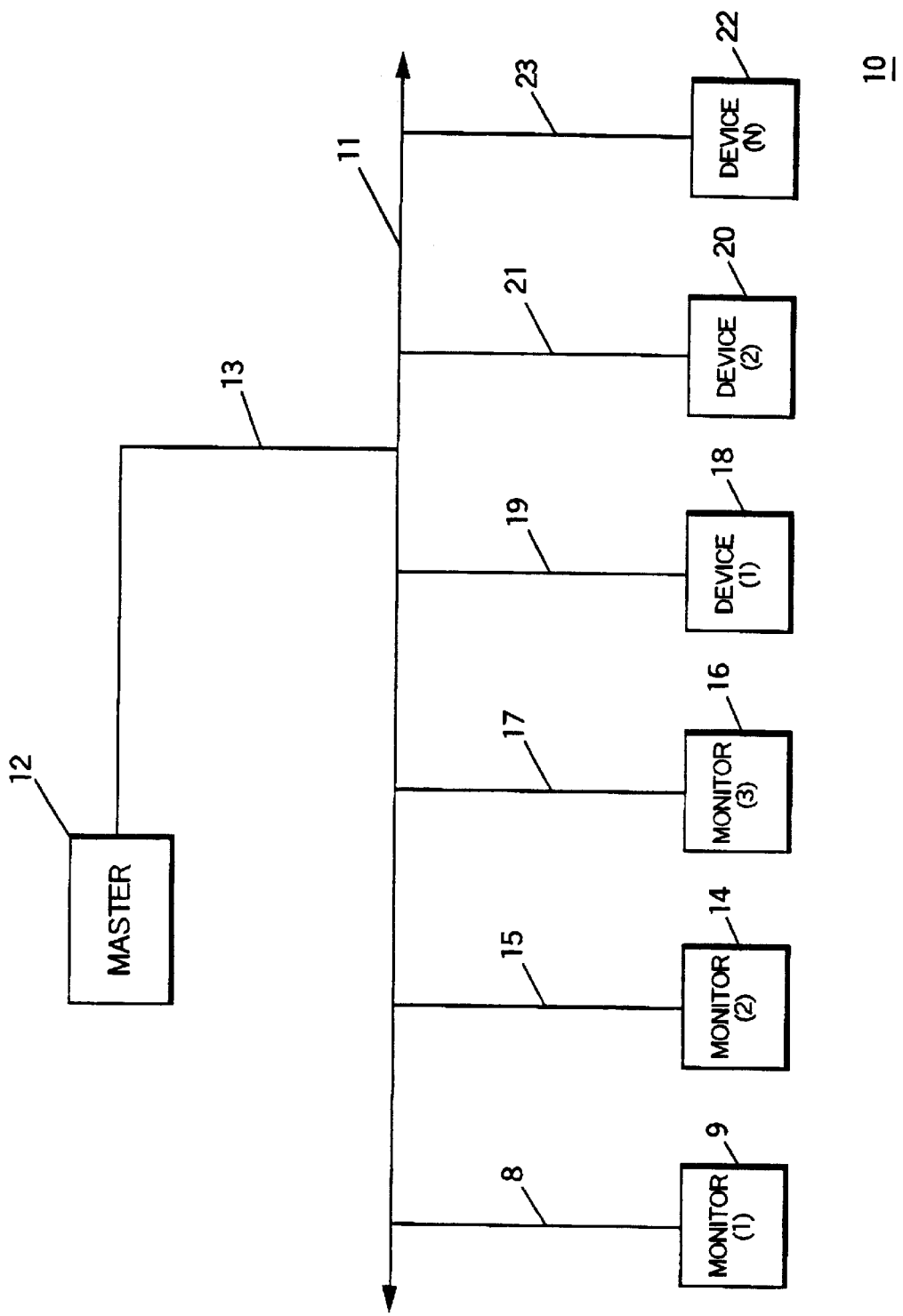
FIG. 1 is schematic representation of the fault tolerant communication bus employing a monitor according to the invention.

A supervisory data acquisition and control system 10, as shown in FIG. 1, includes a number of distributed electrical devices 18, 20, 22 such as relays, meters, circuit breakers and the like described in the aforementioned U.S. patent application Ser. No. 08/628,533, that are interconnected within a LAN 11 by means of conductors 19, 21 and 23, such master-slave communication regimes, a master 12 such as an IBM 350-P75 is required to address any of the devices to request status and other information, and is connected with the LAN by means of a conductor 13. A good example of a circuit breaker having such communication facility is found in U.S. Pat. No. 4,672,501 entitled "Circuit Breaker and Protective Relay Unit". In accordance with the invention, monitors 9, 14, 16 in the form of an enclosure containing a microprocessor, a keypad and an external display are connected with the LAN by means of conductors 8, 15, 17. The monitors are similar to those described in the aforementioned U.S. Patent Application entitled "Interface Monitor for Communicating Between Different Communications Protocols" and are connected with the LAN as slaves for receiving instructions from the master 12. In accordance with the invention, the monitors allow an operator to obtain data from any of the electrical devices at any time.

Figure 2:
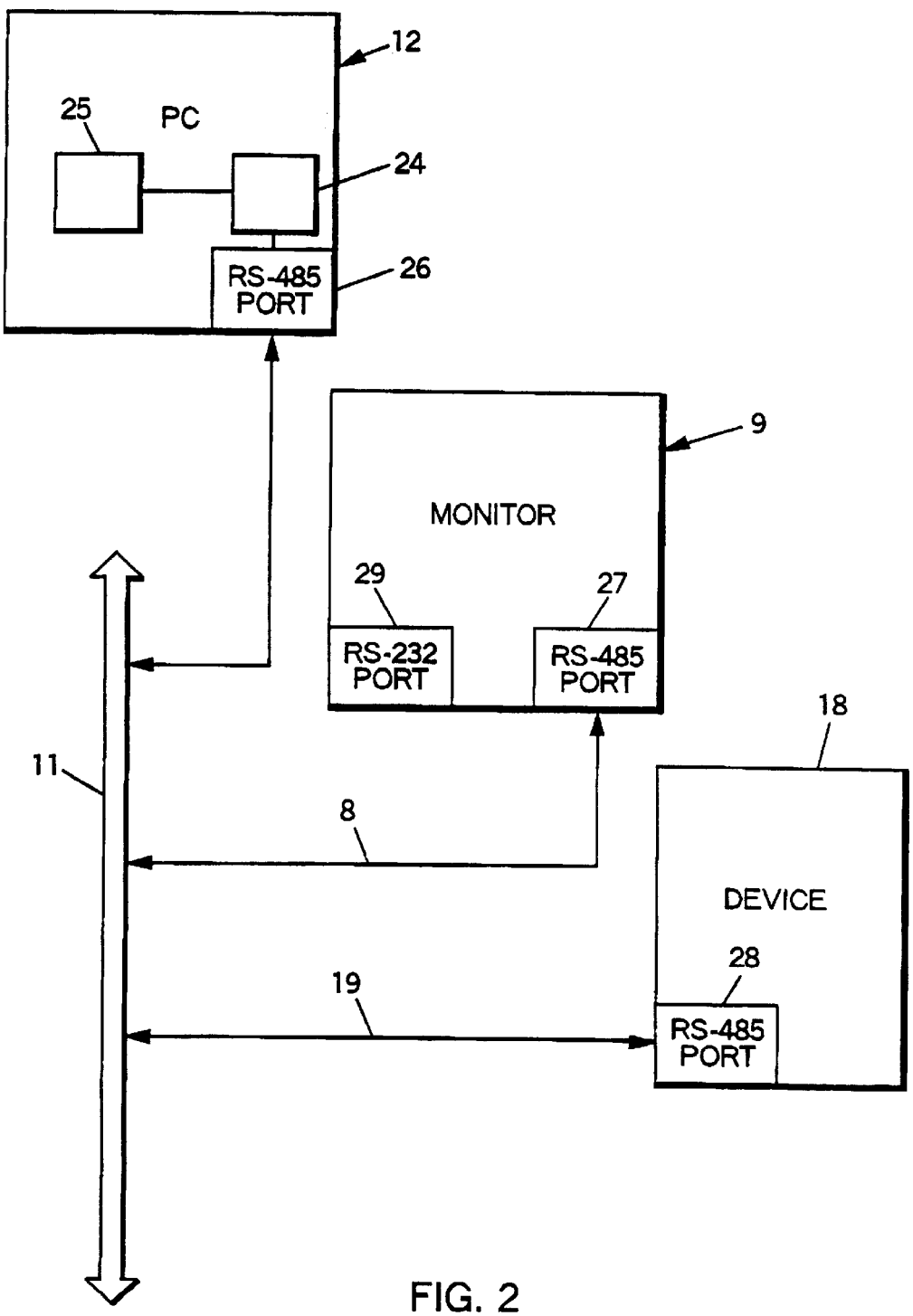
FIG. 2 is an enlarged schematic representation of the communications components within the master, monitor and device depicted in FIG. 1.

This feature is best understood by now referring to FIG. 2 wherein the master 12 is shown having an RS-485 port 26 arranged on a rear surface thereof. One monitor 9, for example, includes both an RS-232 port 29 for receiving an RS-232 cable (not shown) as well as an RS-485 port 27 for receiving an RS-485 conductor 8 that connects with the LAN 11. One electrical device 18, consisting of a circuit breaker, meter or the like, connects with the LAN by means of the RS-485 conductor 19 and the RS-485 port 28. Communication between the RS-232 port 29 and the RS-485 port 27 within the monitor 9 is made by a conversion algorithm resident within the monitor microprocessor as described within the aforementioned U.S. Patent Application entitled "Interface Monitor for Communicating Between Different Communications Protocols".

Figure 3:
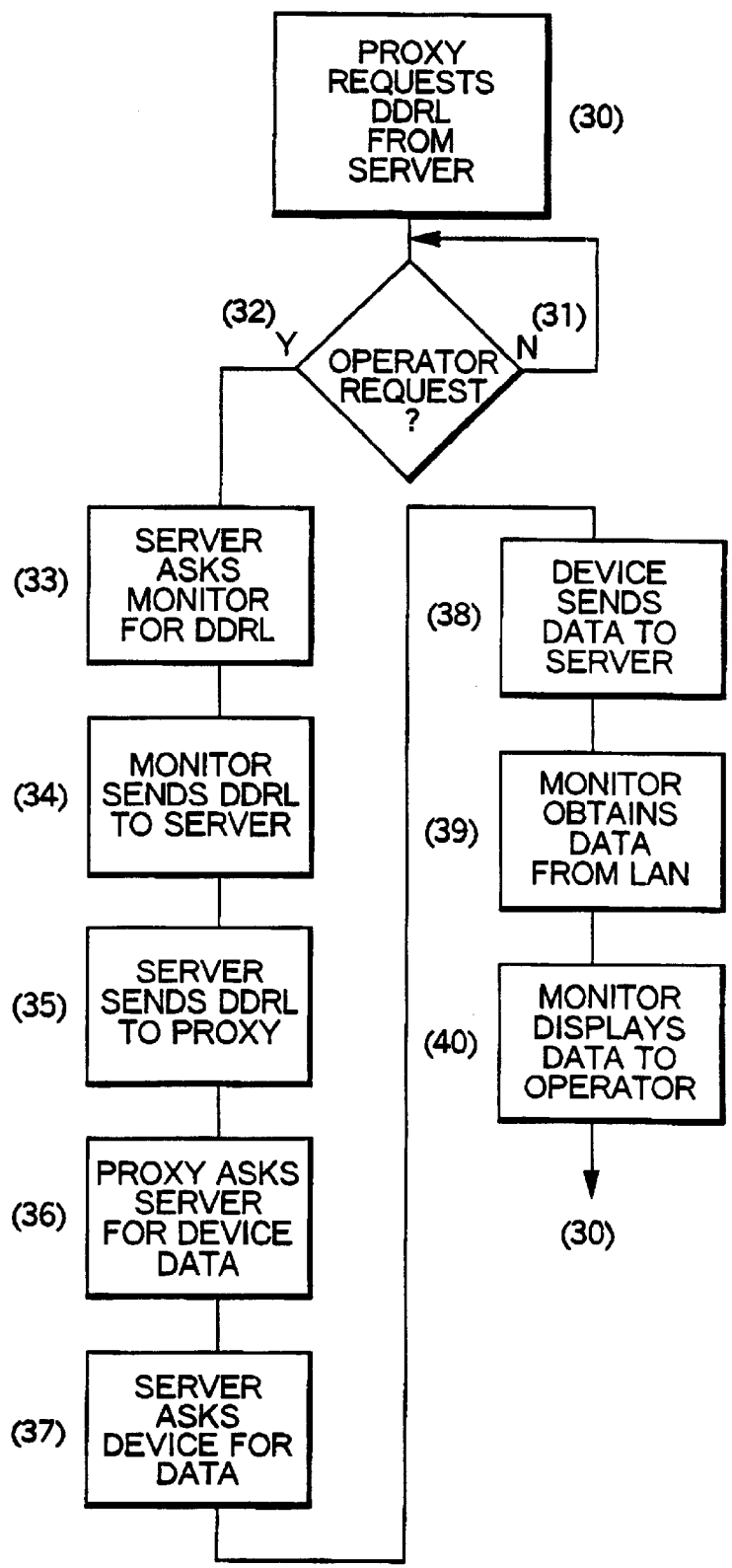
FIG. 3 is a flow chart representation of the algorithms contained within the proxy and server units of FIG. 2.

A server unit 24 is arranged within the master 12 and internally connects between the RS485 port 26 and a proxy unit 25. A good description of the server unit such as the Modbus DDEVO server is found within the aforementioned U.S. patent application Ser. No. 08/628,533. The proxy unit is a type 02-222 obtained from Wonderware Corp., Irvine, Calif. The server and proxy units interact to allow an operator to acquire data from any of the electrical devices 18, 20, 22 shown in FIG. 1 in the manner best seen by referring to the flow chart depicted in FIG. 3.

The proxy requests a device data list (DDRL) from the server on a periodic basis (30) and the server queries the monitors to determine whether there has been an operator request for device data (31). If not, the server continues to query the monitors until a determination is made that an operator request has occurred (32). The server then asks the monitor for the DDRL (33) and the monitor sends the DDRL to the server (34). The server sends the DDRL to the proxy (35) and the proxy asks the server for the device data (36). The server asks the device for the data (37) and the device sends the data to the server (38). The monitor obtains the data from the LAN (39) and displays the data for observation by the operator (40).

In further accordance with the invention, the monitors are able to assume the function of the master in the event that the master is disconnected, or otherwise becomes inoperative. A priority is allocated to the monitors so that only one will act as the master when the master no longer communicates within the LAN.

The presence of the master is an integral part of the master-slave regime on the LAN and it is imperative that the operator be able to obtain device data at all times. A further function of the monitors is to act in the place of a master in the event the master becomes disable to allow fault tolerant communications. With more than one monitor connecting with the LAN, the following arrangement insures that only one monitor acts as master at any one time.

Figure 4A:
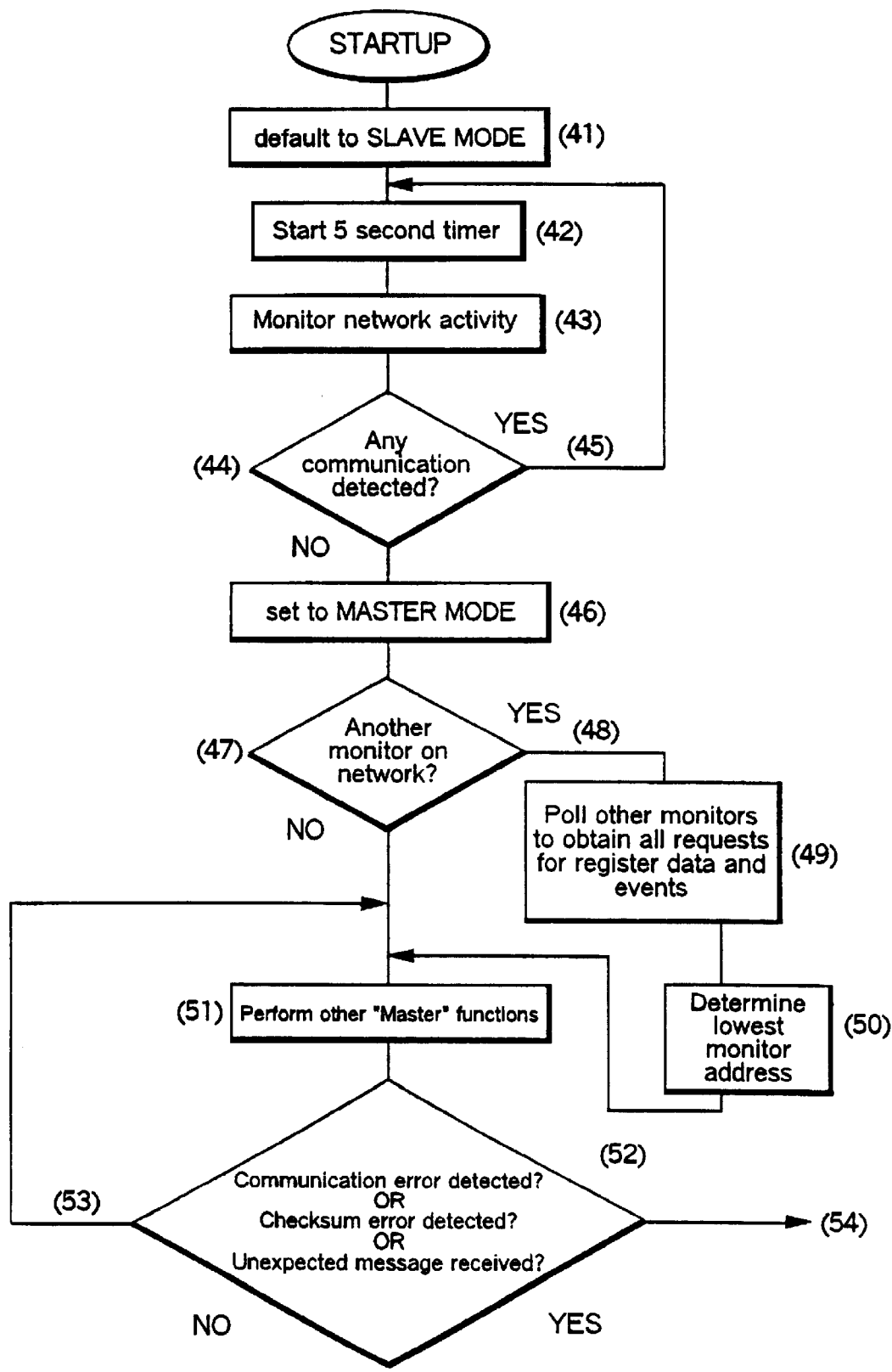
FIGS. 4A and 4B are flow chart representations of the algorithms contained within the monitor units of FIGS. 1 and 2.
Figure 4B:
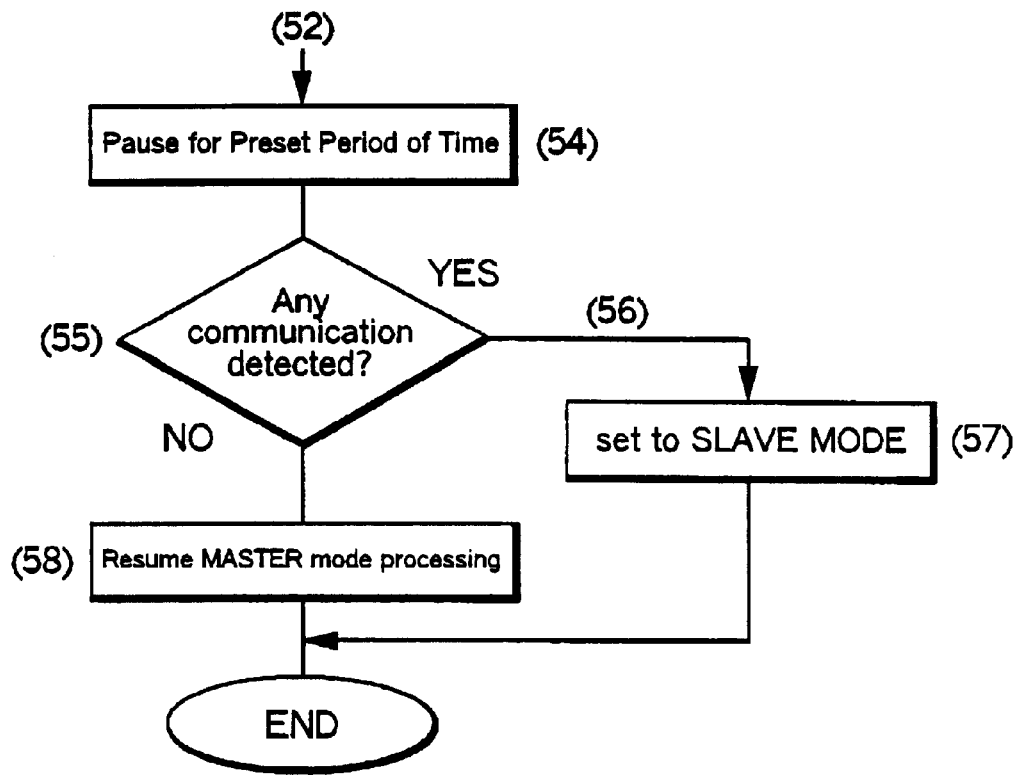

The operating program stored within the monitors 14, 16 of FIG. 1 is depicted in FIGS. 4A and 4B in flow chart format and operates in the following manner. At startup the monitors 9, 14, 16 of FIG. 1 default to slave mode (41), a 5 second timer is initialized (42) and the monitors begin monitoring the LAN for communication activity (43).

A determination is made as to the occurrence of communication on the LAN before the timer times out (44) and if there is communication (45) the monitor remains in slave mode and the timer is again initialized (42).

If there is no communication detected on the LAN (44), the monitors are set to master mode (46), a determination is made as to the presence of additional monitors on the LAN (47). If so (48), each monitor is polled (49), the lowest address is selected as the master (50) and this monitor performs the master role (51).

If there is no other monitor oil the LAN (47), the sole monitor performs the master functions (51) and a determination is then made as to whether a communication or checksum error has occurred, or if an unexpected message is received. If none has occurred (53), the sole monitor continues to perform the master role (51).

If any of the above conditions occur (52), each monitor restrains communication for a predetermined period of time to insure that there is only one monitor communicating on the LAN at one time (54). The monitor with the lowest address delays 5 seconds, the monitor with the next lowest address delays 10 seconds, the monitor with the next lowest address delays 15 seconds, and so on. In the event that the monitor with the lowest address fails to communicate within the prescribed time period (55), the monitor with the next lowest address begins communication (56). This assures that a "master" will be available at all times to perform the necessary communications functions to keep the associated electrical devices operational.

If there is communication (56), the monitor with the higher address is set to slave mode (57) and the monitor with the next lowest address resumes the master role (58).

This fault tolerant communications facet is an important feature of the invention and differs from that described within the aforementioned U.S. Pat. No. 4,817,037 by not requiring an additional arbiter device to determine the new master.

A supervisory control and data acquisition system has herein been disclosed that includes at least one monitor unit in slave mode along with the slave electrical devices. A program within the monitor allows fault tolerant operation of the system upon failure of the master to remain operational. A program in the master allows the monitor to be queried as to data relating to any of the electrical devices with the monitor enabled to respond, in real time.

What is claimed is:

1. A communication system comprising:

a communication bus;

a plurality of power management devices connected with said bus, all of said devices communicating within said bus in a slave mode;

a master processor connected with said bus operating in a master mode wherein said devices communicate with said master processor upon command;

a first monitor processor connected with said bus, wherein, when said master processor is operational, said first monitor processor communicates within said bus in a purely slave mode to obtain from any of said plurality of power management devices upon operator request, said first monitor processor periodically monitoring said bus for detecting communications from said master processor and, wherein, when said master processor is not operational, said first monitor processor communicates with said bus in a master mode.

2. The communication system of claim 1 including a second monitor processor connected with said bus, said second monitor processor communicating within said bus in a slave mode to obtain data from any of said plurality of power management devices upon operator request when said master processor or said first monitor processor is operational, and said second monitor processor periodically monitoring said bus and communicating within said bus in a master mode when said master processor and said first monitor processor are not operational.

3. The communication system of claim 2 further including a third monitor processor connected with said communication bus, said third monitor processor connected with said bus in a slave mode to obtain data from any of said plurality of power management devices upon operator request when said master process or said first monitor processor or said second monitor processor is operational, said third monitor processor periodically monitoring said bus and operating in a master mode when said master processor, said first monitor processor and said second monitor processor are not operational.

4. The communication system of claim 3 wherein said first monitor processor is assigned a lower address within said bus than said second monitor processor and said second monitor processor is assigned a lower address within said bus than said third monitor processor.

5. The communication system of claim 1 wherein said communications bus comprises an RS-485 format.

6. The communications system of claim 1 wherein said power management devices are selected from the group consisting of meters, circuits breakers and relays.

7. A method of providing fault tolerant communication within a communication bus comprising the steps of:

connecting a master processor within said communications bus for operating in a master mode;

connecting a plurality of power management devices within said communications bus for operating in a slave mode; and connecting a first monitor processor within said communications bus;

setting said first monitor processor to slave mode;

using said first monitor processor to obtain data from any of said plurality of power management devices upon operator request;

initiating a timer for a preset period of time;

monitoring said bus with said first monitor processor during said preset period of time;

resetting said timer and repeating the step of monitoring said bus with said first monitor processor if communication from the master processor is detected on said bus;

setting said first monitor processor to master mode if communication from the master processor is not detected on said bus within said preset period of time.

8. The method of claim 7 including the step of connecting a second monitor processor within said communications bus for operating in a slave mode to obtain data from any of said plurality of power management devices upon operator request when said master processor or said first monitor processor is operational, and said second monitor processor periodically monitoring said bus and communicating within said bus in a master mode when said master processor and said first monitor processor are not operational.

9. The method of claim 8 including the step of connecting a third monitor processor from said communications for operating in a slave mode to obtain data from any of said plurality of power management devices upon operator request when said master processor or said first monitor processor or said second monitor processor is operational, said third monitor processor periodically monitoring said bus and operating in a master mode when said master processor, said first monitor processor and said second monitor processor are not operational.

10. The method of claim 9 including the step of assigning said first monitor processor a lower address than said second and third monitor processors.

11. The method of claim 9 including the step of assigning said second monitor processor a lower address than said third monitor processor.

12. The method of claim 7 including the step of configuring said communications bus for operating in an RS-485 format.

* * * * *